(12) United States Patent
Hill et al.

(10) Patent No.: US 11,513,304 B2
(45) Date of Patent: Nov. 29, 2022

(54) MOUNTABLE CONNECTOR BOX FOR FIBER OPTIC CABLES

(71) Applicant: Clearfield, Inc., Minneapolis, MN (US)

(72) Inventors: John P. Hill, Oak Grove, MN (US); Joshua J. Povlitzki, Otsego, MN (US); Randy T. VanHorn, Princeton, MN (US); Timothy J. Kjolsing, Chaska, MN (US)

(73) Assignee: Clearfield, Inc., Minneapolis, MN (US)

( * ) Notice: Subject to any disclaimer, the term of this patent is extended or adjusted under 35 U.S.C. 154(b) by 223 days.

(21) Appl. No.: 16/931,680

(22) Filed: Jul. 17, 2020

(65) Prior Publication Data

US 2021/0018707 A1 Jan. 21, 2021

Related U.S. Application Data

(60) Provisional application No. 62/875,406, filed on Jul. 17, 2019.

(51) Int. Cl.
*G02B 6/00* (2006.01)
*G02B 6/44* (2006.01)

(52) U.S. Cl.
CPC .................. *G02B 6/4446* (2013.01)

(58) Field of Classification Search
CPC ...... G02B 6/4446; G02B 6/00; G02B 6/3897; G02B 6/4472; G02B 6/445
See application file for complete search history.

(56) References Cited

U.S. PATENT DOCUMENTS

| | | | | |
|---|---|---|---|---|
| 2002/0181925 A1* | 12/2002 | Hodge | .................. | G02B 6/483 385/136 |
| 2005/0271344 A1* | 12/2005 | Grubish | ................. | G02B 6/445 385/135 |
| 2014/0023334 A1* | 1/2014 | Larsson | ............... | G02B 6/4446 385/135 |
| 2019/0025532 A1* | 1/2019 | Kaplan | ................ | G02B 6/4447 |

\* cited by examiner

*Primary Examiner* — Jennifer Doan
(74) *Attorney, Agent, or Firm* — Troutman Pepper Hamilton Sanders LLP

(57) ABSTRACT

A connector box has a housing forming a space and a cover configured to provide access to the space, a plurality of connectors configured to enable selective connection of fiber optic cables within the enclosed space, and a drop cable entrance assembly configured to provide an opening for one or more drop cables to enter the space in the housing. The drop cable entrance assembly has a housing opening portion providing access to the space from an exterior of the housing and having a removable plate and a grommet, and a cable clamp portion configured to hold the one or more drop cables in place via contact pressure.

17 Claims, 28 Drawing Sheets

MOUNTABLE CONNECTOR BOX FOR FIBER OPTIC CABLES

CROSS REFERENCE TO RELATED APPLICATION

The present application claims benefit of priority under 35 U.S.C. 119(e) to the filing date of U.S. Provisional Patent Application 62/875,406, filed on Jul. 17, 2019, entitled, "Mountable Connector Box For Fiber Optic Cables," the contents of which are incorporated herein by reference in their entirety.

TECHNICAL FIELD

The present disclosure relates generally to optical fiber communications, and more specifically to a mountable connector box for optical fiber cables.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable.

With the increasing desire for completely optical networks, "fiber to the premises" (FTTP) or "fiber to the home" (FTTH) systems are being developed to provide optical fibers that extend from the source to the site of the end-user. For this purpose, connector boxes are needed for interconnection of various lines with drop cables that extend to user locations. Moreover, as customer demand increases, large-capacity connector boxes are desirable to minimize installation costs and improve efficiency. However, larger capacity may generally come at the expense of organization (e.g., cable management and routing), weather-proofing, and ease of security and access. There is an additional need for flexibility for connector boxes when it comes to connector type and access, as well as box mounting for various conditions and environments.

The present disclosure includes components and configurations that address this and other issues related to fiber optic cables and connector boxes.

SUMMARY

In an exemplary embodiment, the present disclosure describes a connector box. The connector box includes a housing forming a space and a cover configured to provide access to the space, a plurality of connectors configured to enable selective connection of fiber optic cables within the enclosed space, and a drop cable entrance assembly configured to provide an opening for one or more drop cables to enter the space in the housing. The drop cable entrance assembly includes a housing opening portion providing access to the space from an exterior of the housing and including a removable plate and a grommet, and a cable clamp portion configured to hold the one or more drop cables in place via contact pressure.

In some embodiments, the housing opening portion may be configured to fill in a slot formed in an outer wall of the housing. In some embodiments, the removable plate may be shaped to complete a continuous shape of the outer wall of the housing. In some embodiments, the grommet may be positioned between the removable plate and the housing. In some embodiments, the removable plate may be slidable relative to the housing. In some embodiments, the grommet may be a split grommet. In other embodiments, the grommet may be a foam block.

In various embodiments, the cable clamp portion may comprise a channel plate and a pressure plate attached to the housing. The channel plate may comprise a plurality of channels each for receiving a drop cable. In some embodiments, the pressure plate may be V-shaped to provide two contact points for holding the drop cable in place. The cable clamp portion may comprise a plurality of channel plates and a plurality of pressure plates alternatively stacked on each other and attached to the housing.

In some embodiments, the connector box may further comprise an internal panel dividing the space into a front compartment and a rear compartment. The front compartment may comprise a side compartment having a full depth of the housing. The drop cable entrance assembly may be adjacent to the side compartment.

In some embodiments, the connector box may comprise one or more routing managers configured to guide one or more cables within the front or rear compartment.

In some embodiments, the internal panel may comprise a plurality of slots connecting the rear compartment to the front compartment. The adapters may be positioned in each of the plurality of slots, and configured to provide selective connection between cables in the front compartment and cables in the rear compartment. The plurality of slots and adapters may be angled to be closer to being parallel to a plane of the internal panel than to being perpendicular thereto.

In some embodiments, the connector box may provide at least forty-eight connections between cables in the front compartment and cables in the rear compartment via the adapters.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Aspects of the present disclosure provide a connector box for fiber optic cables. The connector box (which may otherwise be known as a wall box, transition box, handoff box, etc.) supplies one or more cable connections between one or more fiber optic cables. In an exemplary embodiment, the connector box includes an a cable input area, a cable output area, and a connection area in-between, within the enclosure of the connector box. The connection area may provide a relatively large capacity for a plurality of fiber optic cables to be split and interconnected by adapters enabling selective assignment and connection of cables.

The present disclosure is not limited in terms of the particular embodiments described in this application, which are intended as illustrations of various aspects. Many modifications and variations can be made without departing from its spirit and scope, as will be apparent to those skilled in the art. For example, various configurations of a mounting bracket or other mounting means may be provided.

Figure 1:
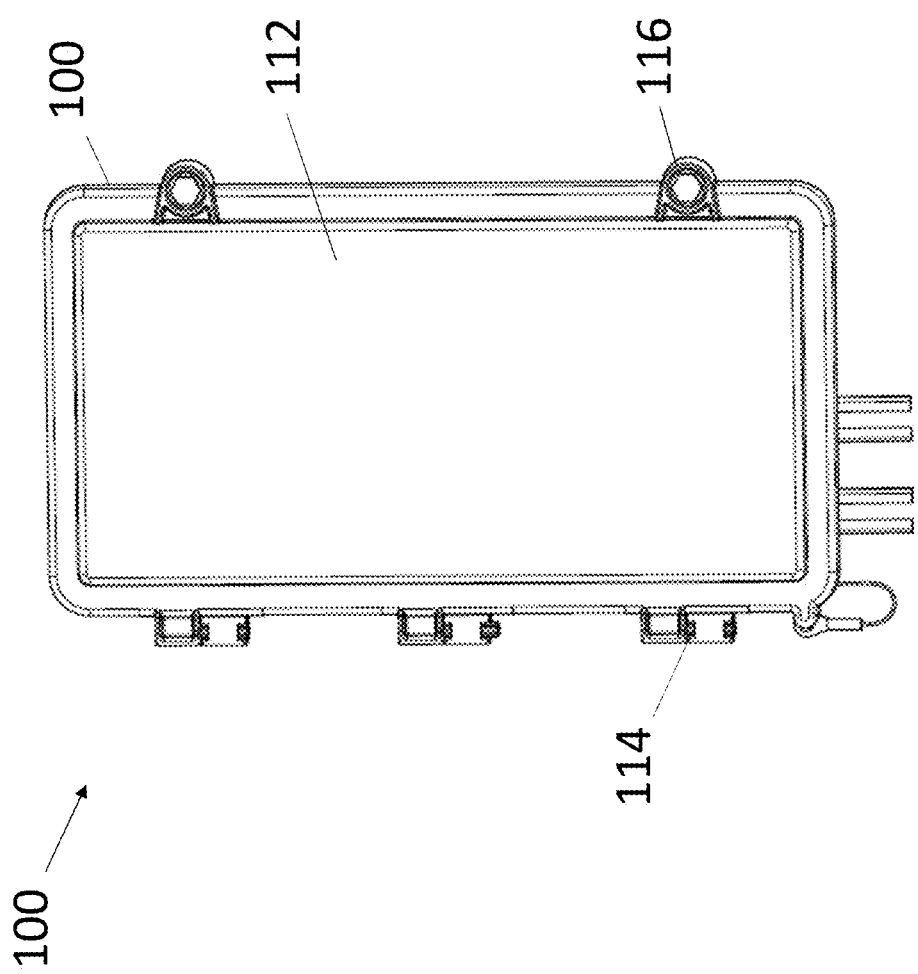
FIG. 1 is an image of a front perspective view of one embodiment of a connector box configured according to aspects of the present disclosure.
Figure 2:
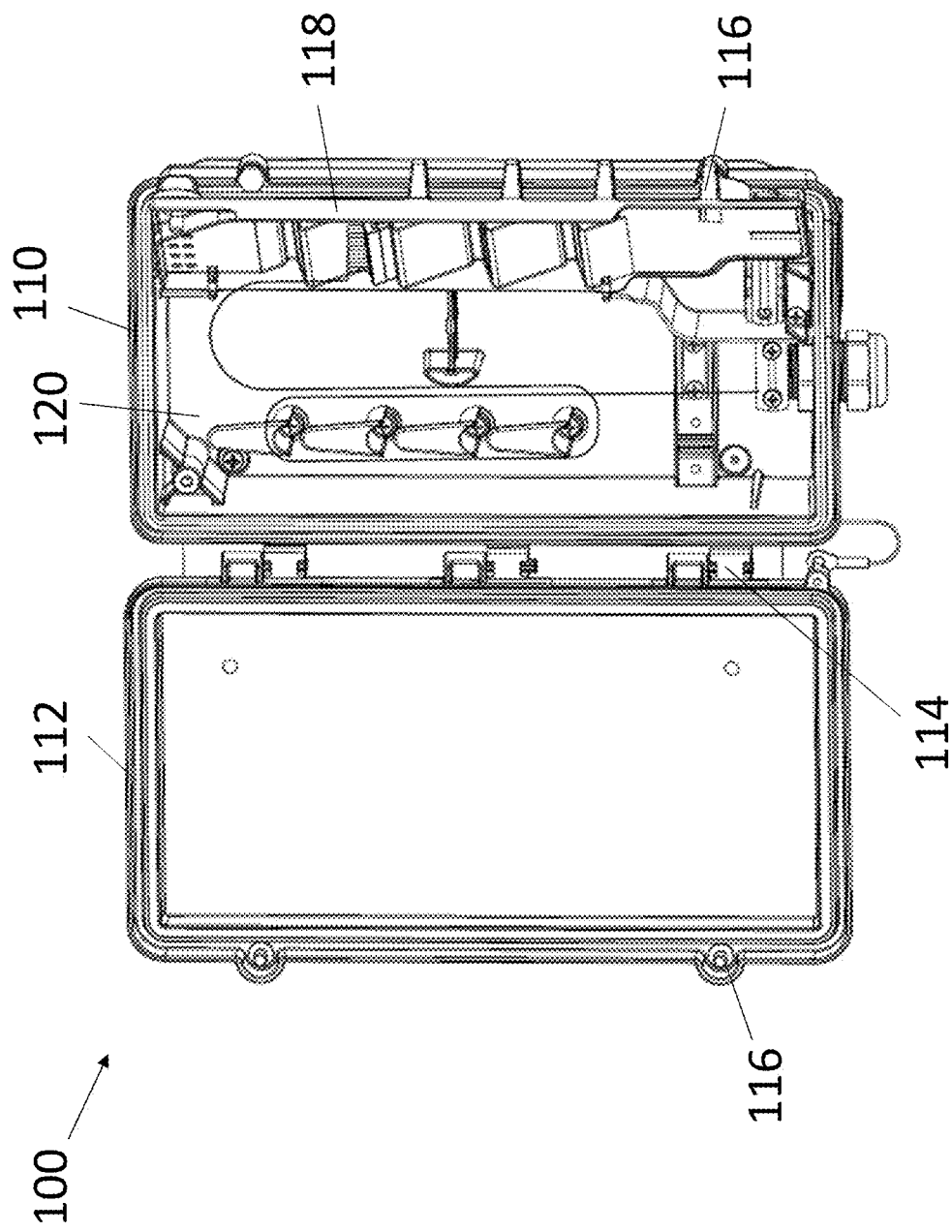
FIG. 2 is an image of a front perspective view of the connector box of FIG. 1, with a cover and an internal panel in an open position according to aspects of the present disclosure.

FIGS. 1-6 are various perspective views of one embodiment of a connector box 100. The connector box 100 includes a housing 110 and a cover 112. The housing 110 forms an enclosed space that is accessed via opening of the cover 112. The cover 112 may be secured to the housing 110 via a hinge 114 and a locking mechanism 116. The hinge 114 may be a slide-off hinge to provide ease of access in tight spaces. The locking mechanism 116 may include standard locking features in the art such as a bolt or keyed lock. FIG. 1 illustrates the cover 112 in a closed position. FIG. 2 illustrates the cover 112 in an open position.

Figure 3:
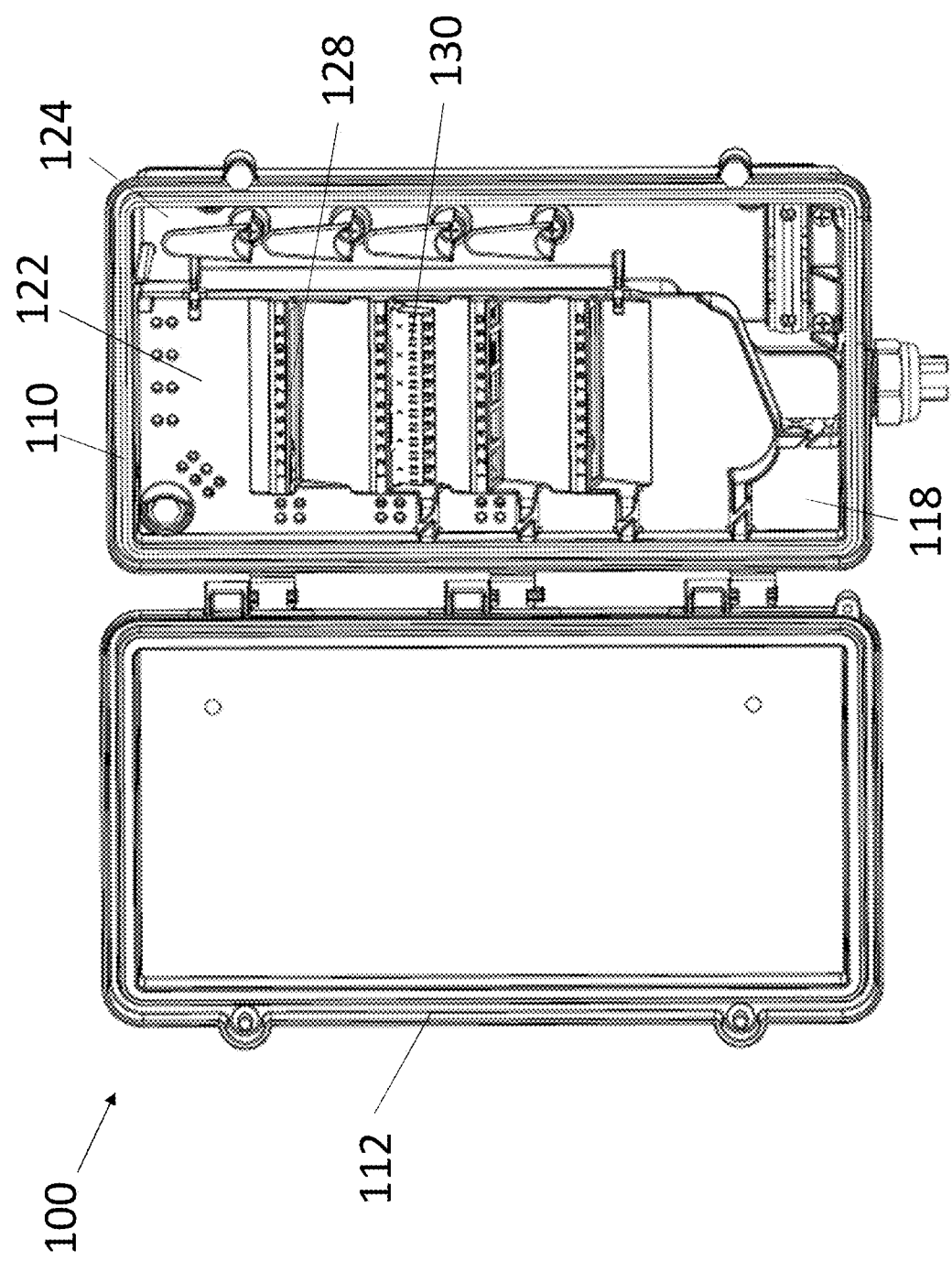
FIG. 3 is another image of a front perspective view of the connector box, with the cover in an open position and the internal panel in a closed position according to aspects of the present disclosure.
Figure 4:
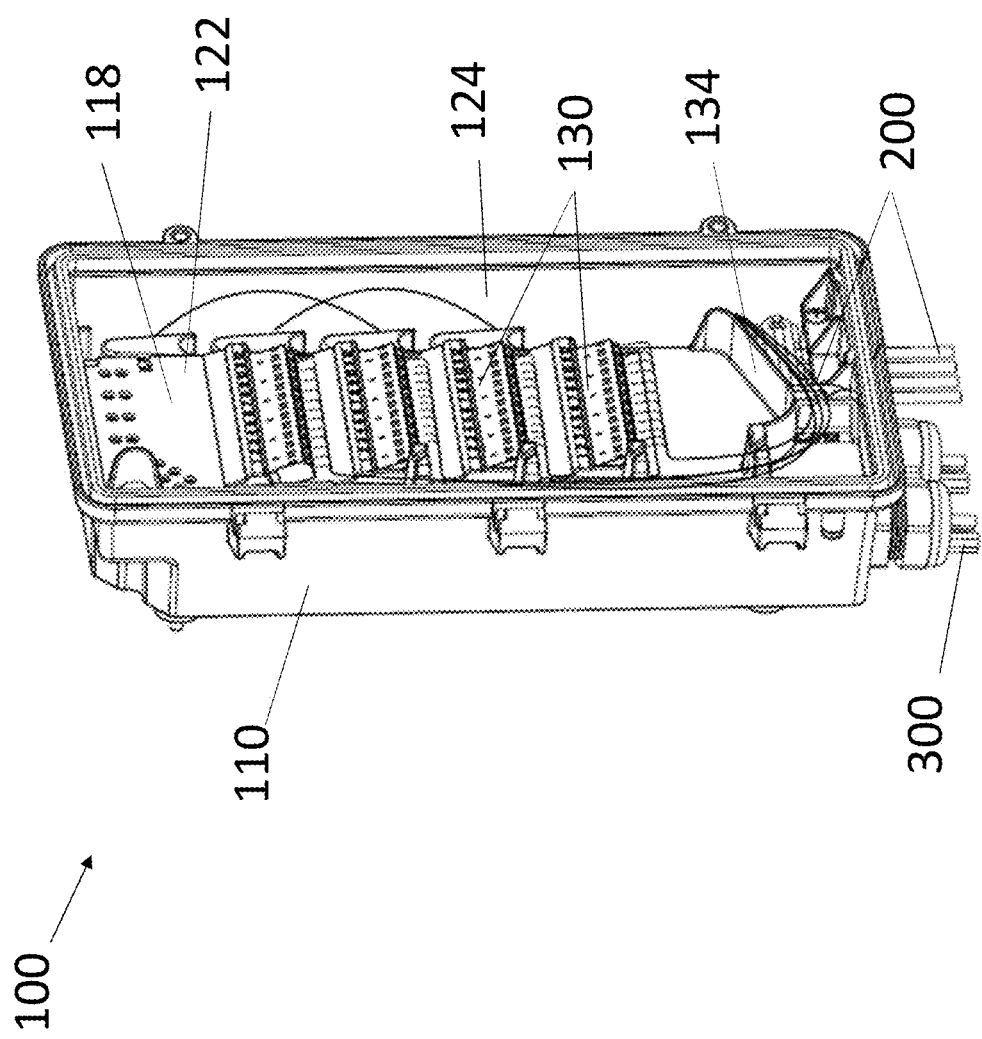
FIG. 4 is another image of a front perspective view of the connector box, with the cover removed and the internal panel in a closed position according to aspects of the present disclosure.
Figure 5:
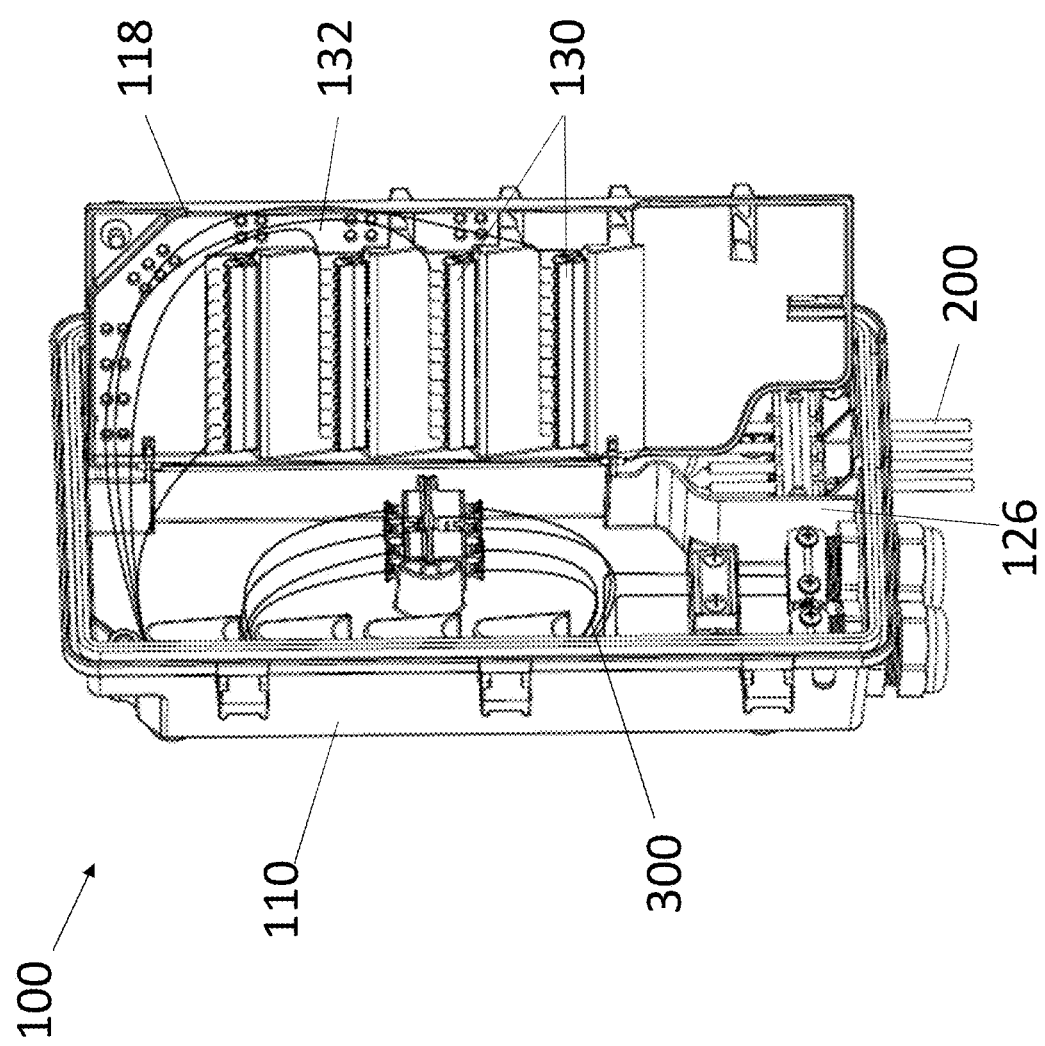
FIG. 5 is another image of a front perspective view of the connector box, with the cover removed and the internal panel in an open position according to aspects of the present disclosure.
Figure 6:
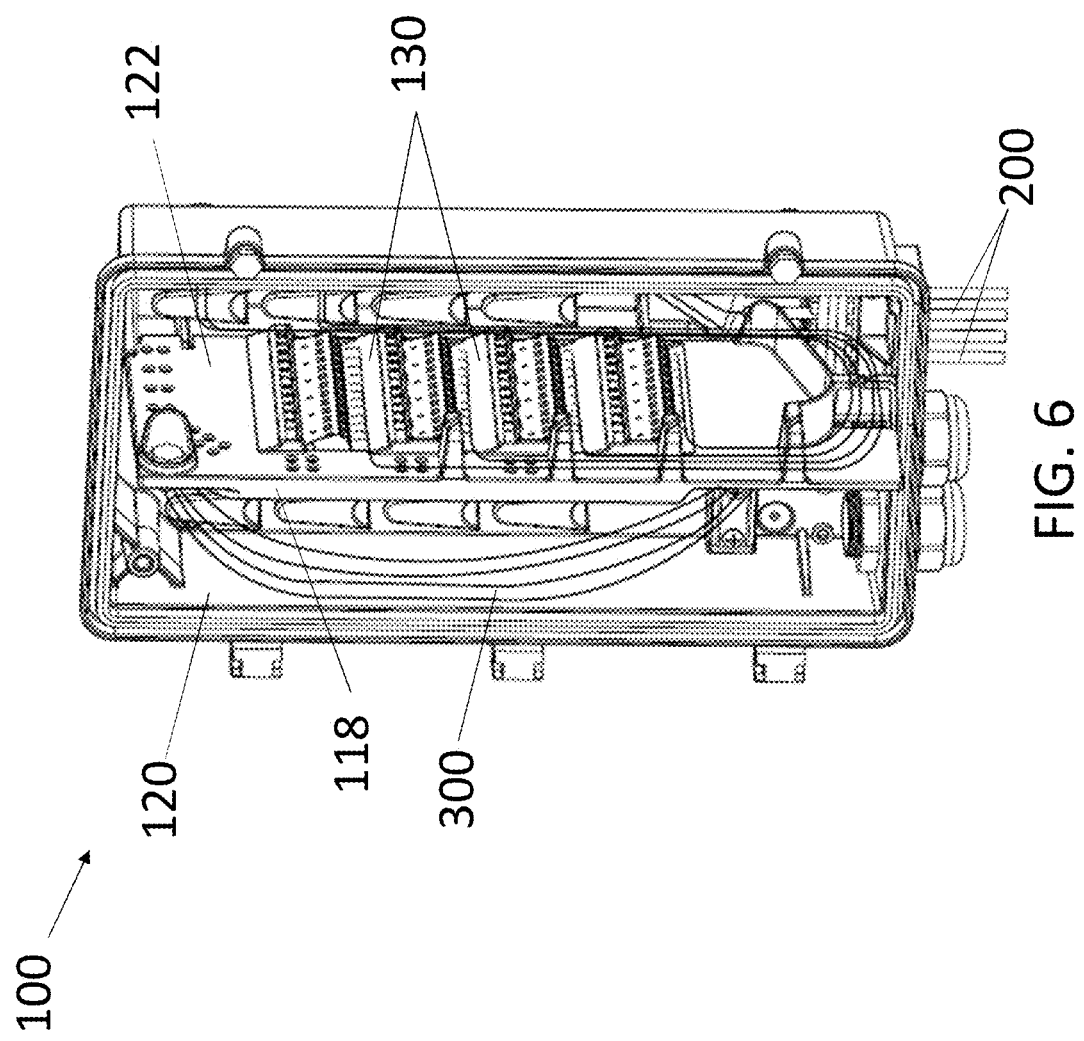
FIG. 6 is an image of an additional front perspective view of the connector box, with the cover removed and the internal panel in an open position according to aspects of the present disclosure.

The connector box 100 further includes an internal panel 118 that divides the enclosed space into two different areas. FIGS. 3 and 4 illustrate the internal panel 118 in a closed position and FIGS. 5 and 6 illustrate the internal panel 118 in an open position, exposing a rear compartment 120 behind the internal panel 118. A space in front of the internal panel 118 may be considered a front compartment 122. The front compartment 122 may comprise the space in front of the internal panel 118 and a side compartment 124. The side compartment 124 may include a full depth of the housing 110 with a stationary divider panel 126 separating the side compartment 124 from the rear compartment 120.

The internal panel 118 may be hinged or otherwise removably connected to the stationary divider panel 126 and the housing 110. A locking mechanism may be control access to the rear compartment 120. In an exemplary embodiment, the rear compartment 120 may be a telecommunications compartment that is accessible by a service provider employee while the front compartment 122 is a customer compartment that is accessible to a customer (e.g., without having access to the telecommunications compartment).

FIGS. 4-6 further illustrate a fiber optic cable arrangement, including an input cable 200 and an output cable 300. The input cable(s) 200 may include drop cables (e.g., flat drop cables) that supply a signal from a service provider. The output cable(s) 300 may include runner cables that deliver a service provider signal to a plurality of destinations (e.g., consumers). The input cables 200 and output cables 300 may be considered originating, intermediate, or terminal cables in the overall cable system with the connector box 100 being positioned therebetween for providing the selective connections for a plurality of end-user locations.

The internal panel 118 includes a plurality of slots 128 that provide access between the rear compartment 120 and the front compartment 122. Each slot 128 may be configured to receive an adapter 130 comprising a plurality of individual fiber optic connections. For example, each adapter 130 may provide twelve connectors for a fiber optic cable. The connector box 100 may provide four slots 128 for four adapters 130, and thus provide forty-eight connectors for a fiber optic cable. Each adapter 130 may include port designations and labeling for ease of identification of each associated connector. It should be understood that the connector box and components may be scaled up or down for different numbers of connections.

In an exemplary embodiment, the input cables 200 enter the connector box 100 at the side compartment 124. The input cables 200 run through the side compartment 124 and are routed to a front side of the internal panel 118 via a plurality of routing managers 132. The routing managers 132 may include radiused surfaces that guide the cables in a preferred direction and provide efficient cable management within the connector box 100. The routing managers 132 may include 180-degree posts for enabling the input cables 200 to extend in two directions within the side compartment 124. The routing managers 132 may also include an angled and curved flange 134 for directing the input cables 200 from the side compartment 124 to a front side of the internal panel 118 and the area of the adapters 130. Each of the connections created by the adapters 130 may provide a selectively connected or disconnected connection location for consumer service line. The output cables 300 may be connected within the rear compartment 120 to create live connections within the adapters 130 for selective connection of the spliced/divided input cables 200. As shown in FIG. 5, the output cables 300 may converge from their individual wires at the adapters 130 and route within the rear compartment, including on the internal panel 118, to exit the connector box 100. A rear side of the internal panel 118 may include a routing manager 132 for converging the output cables 300 from the various adapters 130 along the internal panel 118.

Figure 7:
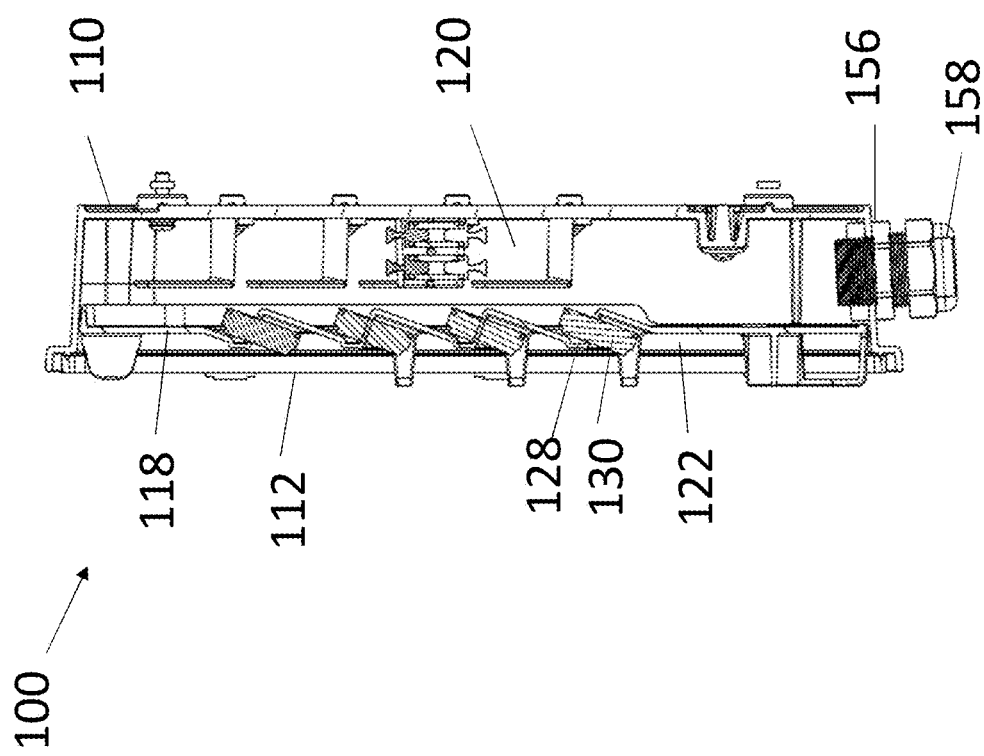
FIG. 7 is a cross-sectional view of one embodiment of a connector box configured according to aspects of the present disclosure.

FIG. 7 is a cross-sectional view of the connector box 100. The adapters 130 are positioned at an angle for connector access and cable management. For example, the slots 128 and adapters 130 may be provided at a significant angle that is closer to parallel with the plane of the internal panel 118 than perpendicular thereto. In this way, the input cables 200 and output cables 300 may run close to the surface of the internal panel 118 and the routing managers 132.

Figure 8:
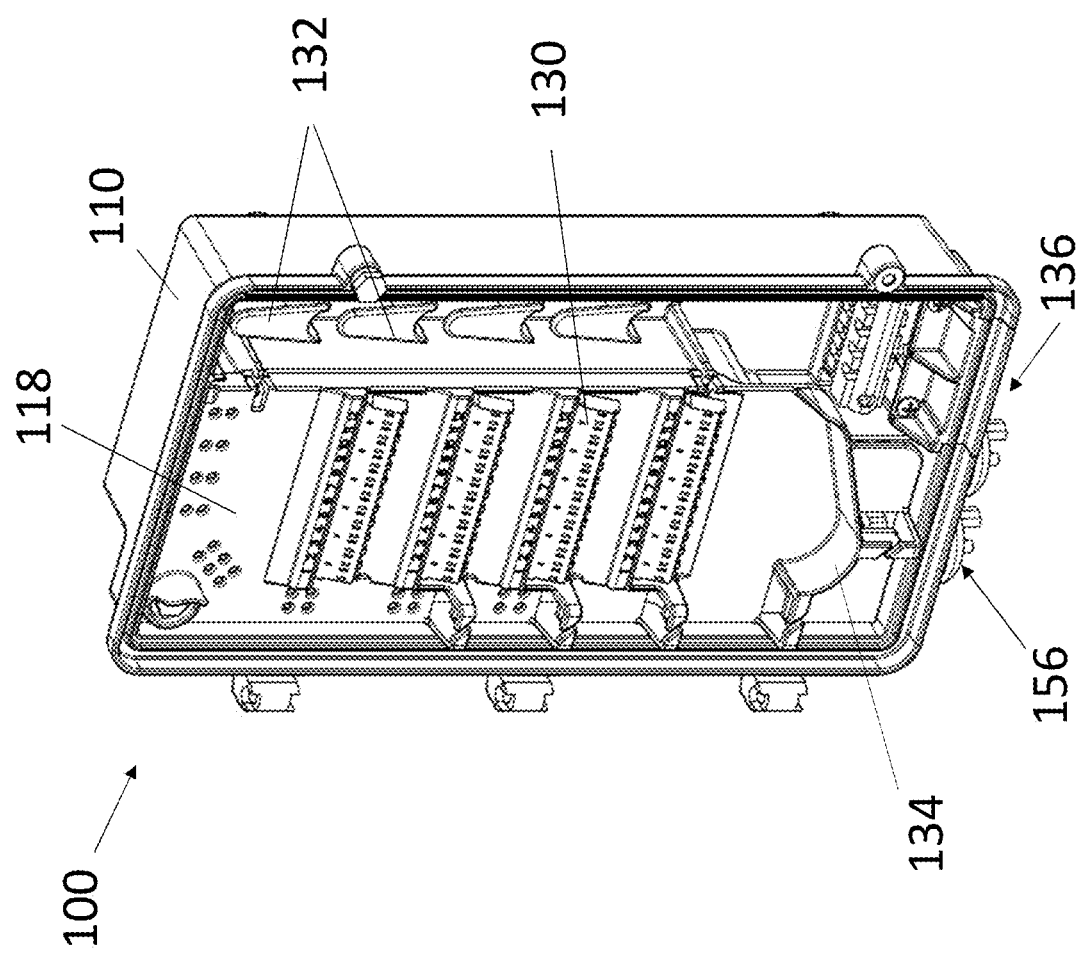
FIG. 8 is a front perspective view of the connector box according to aspects of the present disclosure.

FIG. 8 is a perspective view of the connector box 100 with the cover 112 removed from the housing 110, exposing the front compartment 122. The internal panel 118 is closed and four adapters 130 are placed in the slots 128.

Figure 9:
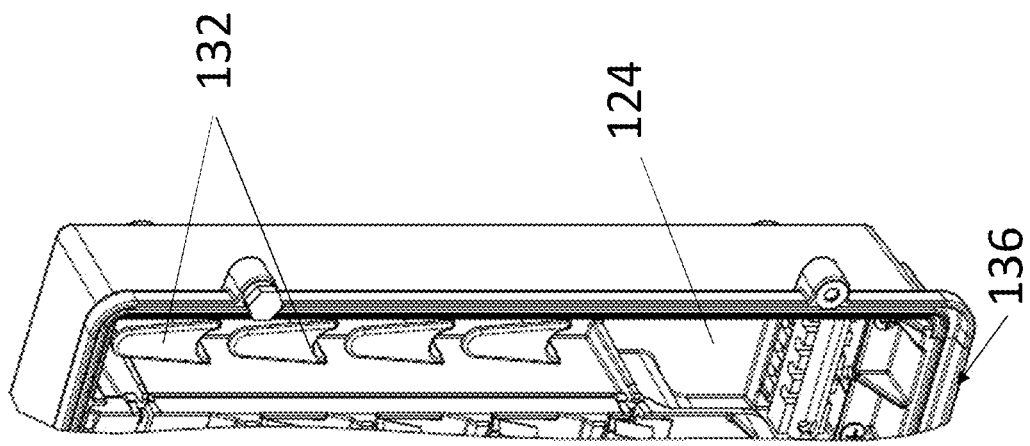
FIG. 9 is a close-up view of a side compartment of the connector box according to aspects of the present disclosure.
Figure 10:
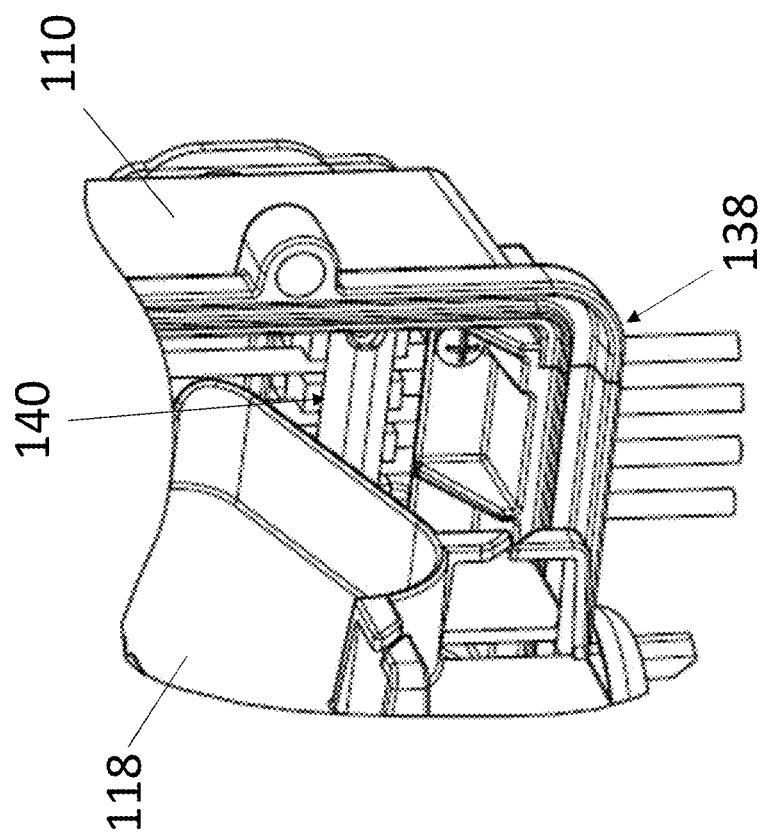
FIG. 10 is a close-up view of a drop cable entrance assembly according to aspects of the present disclosure.
Figure 11:
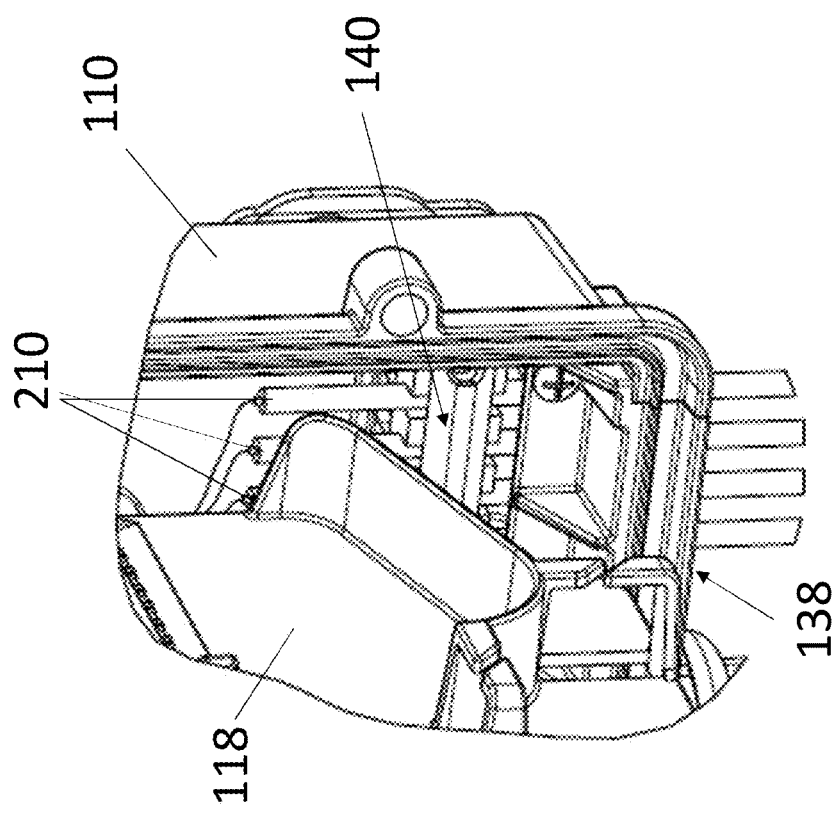
FIG. 11 is another close-up view of the drop cable entrance assembly with cables therein, according to aspects of the present disclosure.
Figure 12:
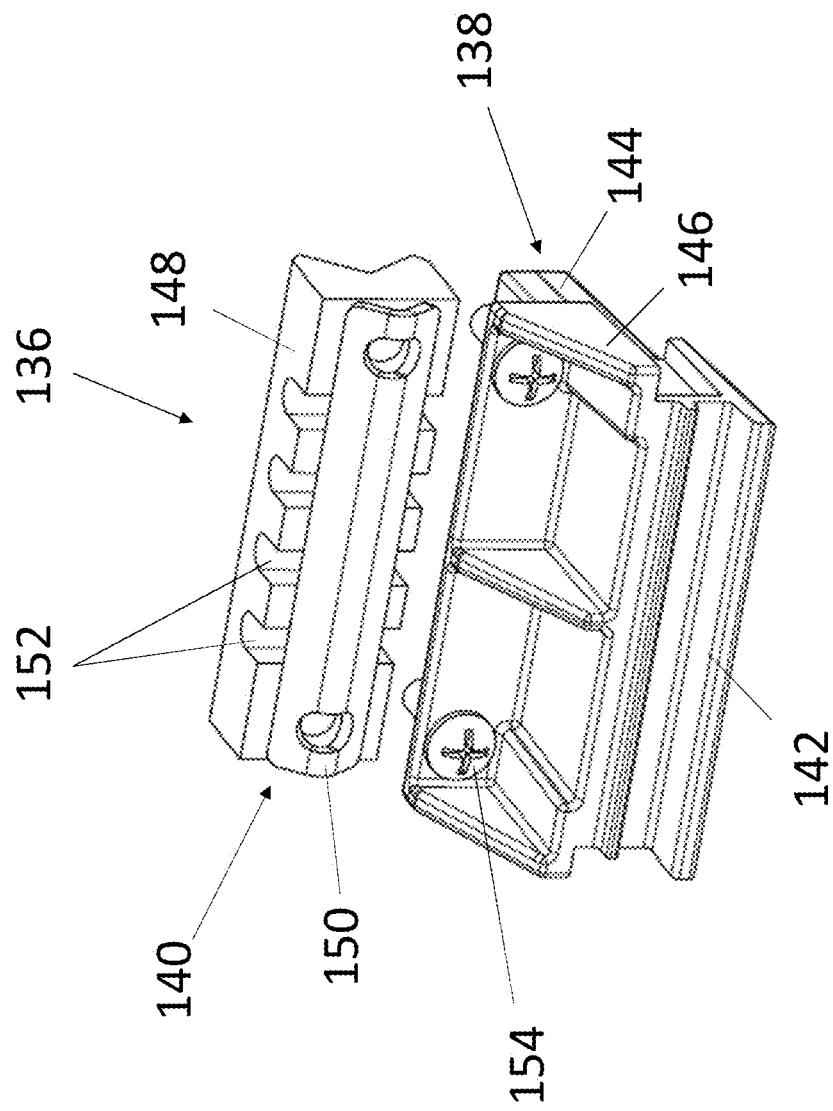
FIG. 12 is isolated views of the components of an exemplary embodiment of the drop cable entrance assembly according to aspects of the present disclosure.
Figure 13:
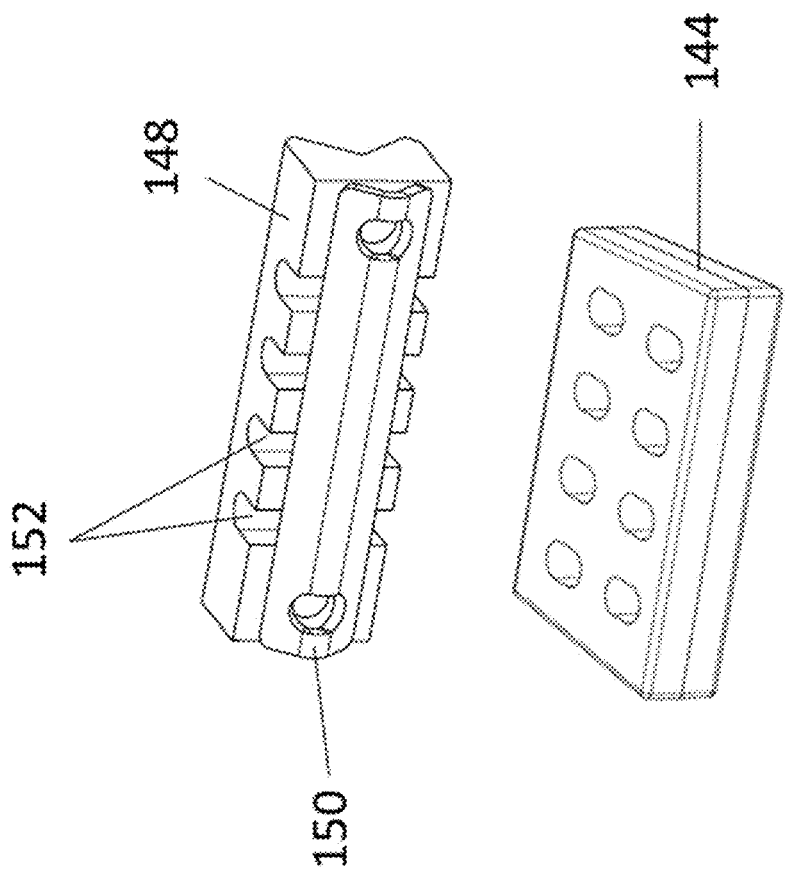
FIG. 13 is isolated views of the components of FIG. 12, without a removable plate according to aspects of the present disclosure.

FIG. 9 is a close-up view of the side compartment 124, which may serve as an initial routing space for the input cables 200. The side compartment 124 by be adjacent to a drop cable entrance assembly 136. The drop cable entrance assembly 136 provides a weather-proof assembly for enabling the input cable 200 to enter the housing 110 of the connector box 100.

FIGS. 10-23 are close-up and isolated views of the drop cable entrance assembly 136. The assembly 136 is configured to accept a plurality of drop cables 210 (e.g., flat drop cables) and includes a housing opening portion 138 and a cable clamp portion 140. The housing opening portion 138 provides an interactive connection feature for accessing an opening into the housing for the drop cables 210. The cable clamp portion 140 provides a securing mechanism for holding the drop cables 210 in place (e.g., inhibiting sliding movement).

Figure 14:
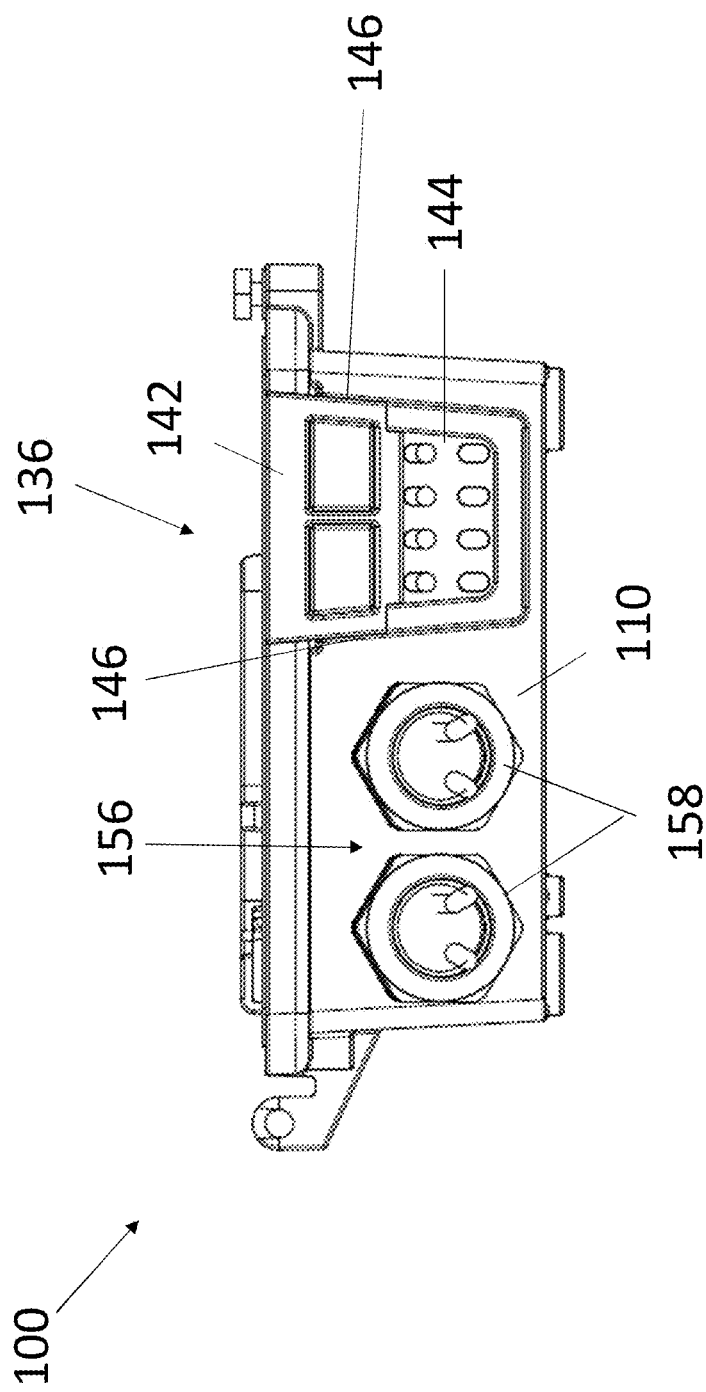
FIG. 14 is a bottom view of the connector box, with the drop cable entrance assembly in place on the housing, according to aspects of the present disclosure.
Figure 15:
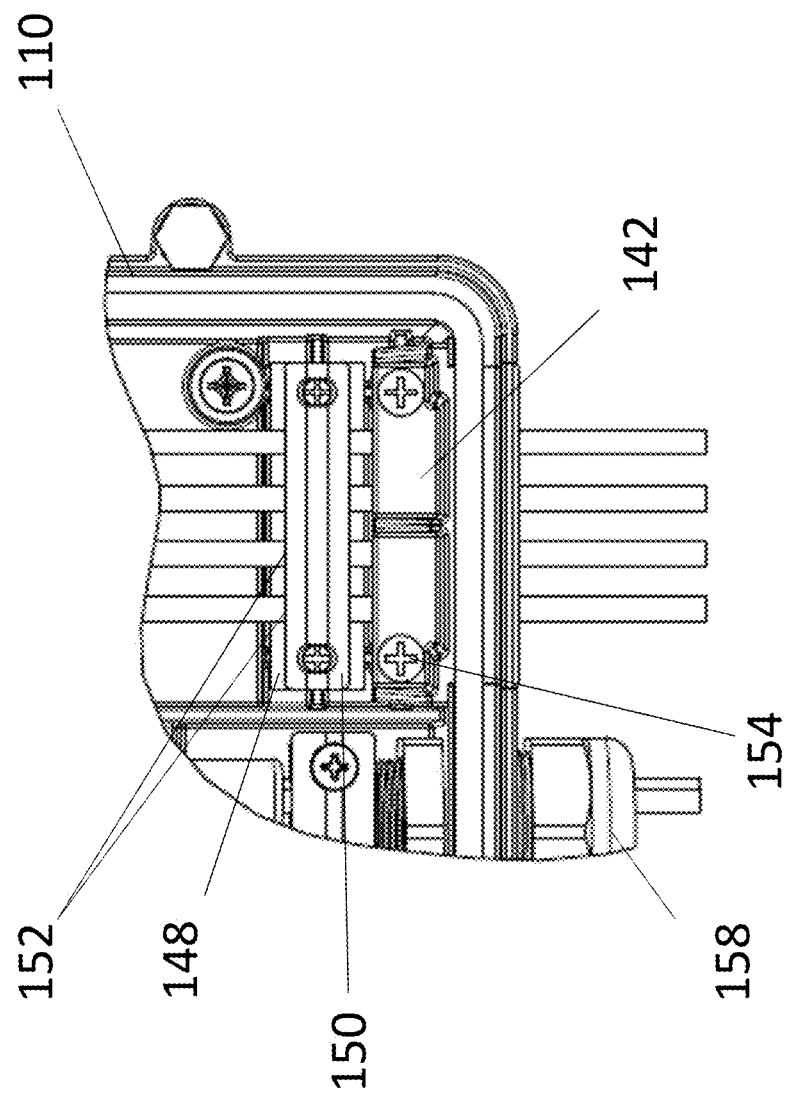
FIG. 15 is a close-up front view of the drop cable entrance assembly, according to aspects of the present disclosure.
Figure 16:
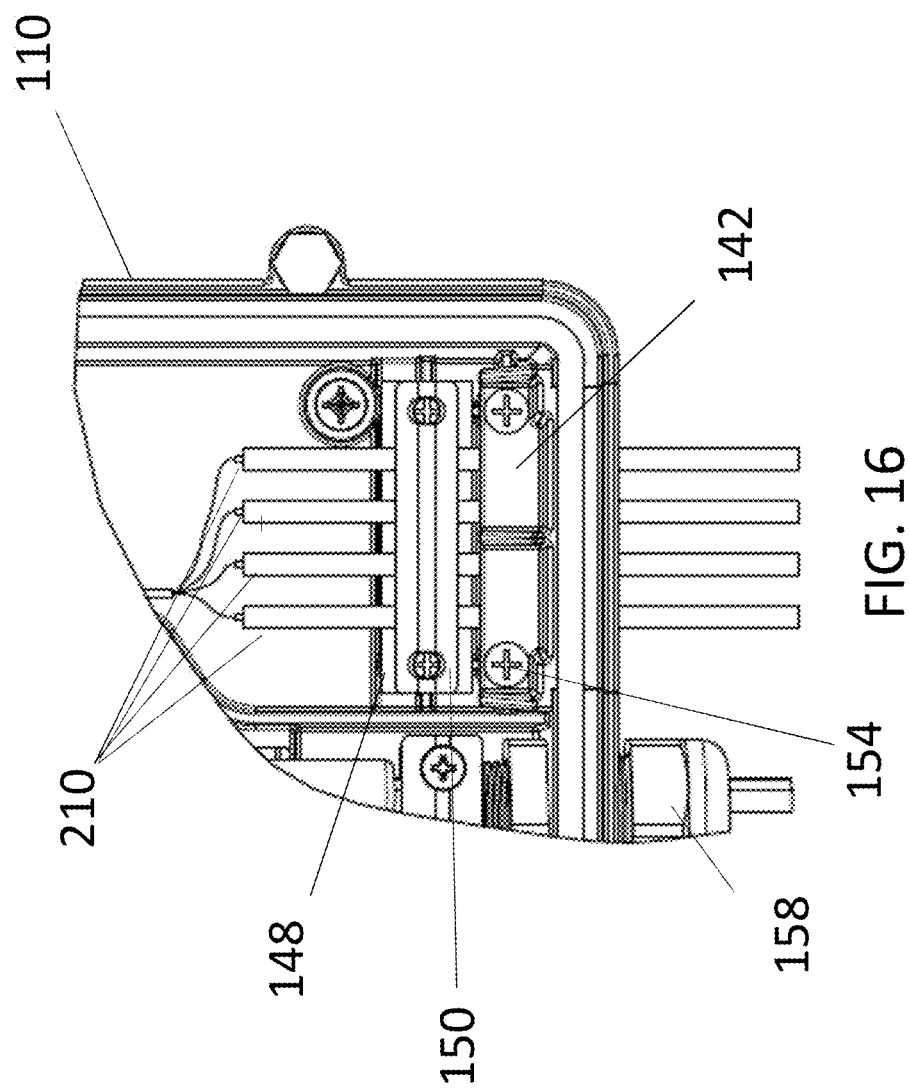
FIG. 16 is another close-up front view of the drop cable entrance assembly with cables therein, according to aspects of the present disclosure.
Figure 17:
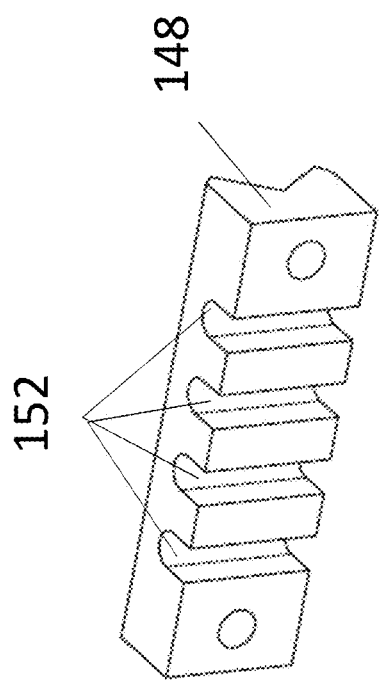
FIG. 17 is a perspective view of a channel plate according to aspects of the present disclosure.
Figure 18:
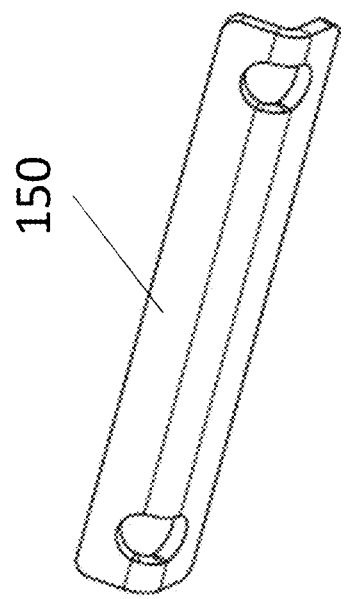
FIG. 18 is a perspective view of a pressure plate according to aspects of the present disclosure.
Figure 19:
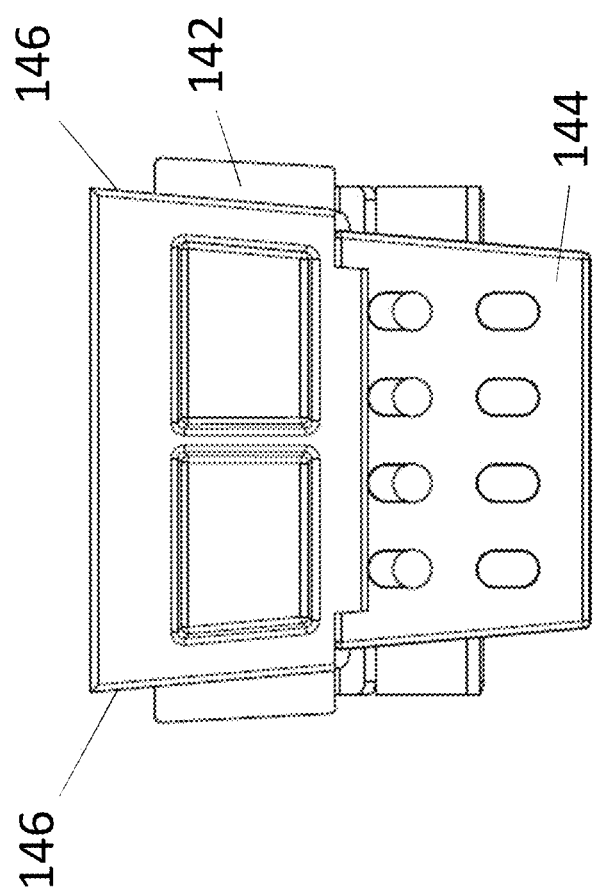
FIG. 19 is a bottom view of the drop cable entrance assembly according to aspects of the present disclosure.
Figure 20:
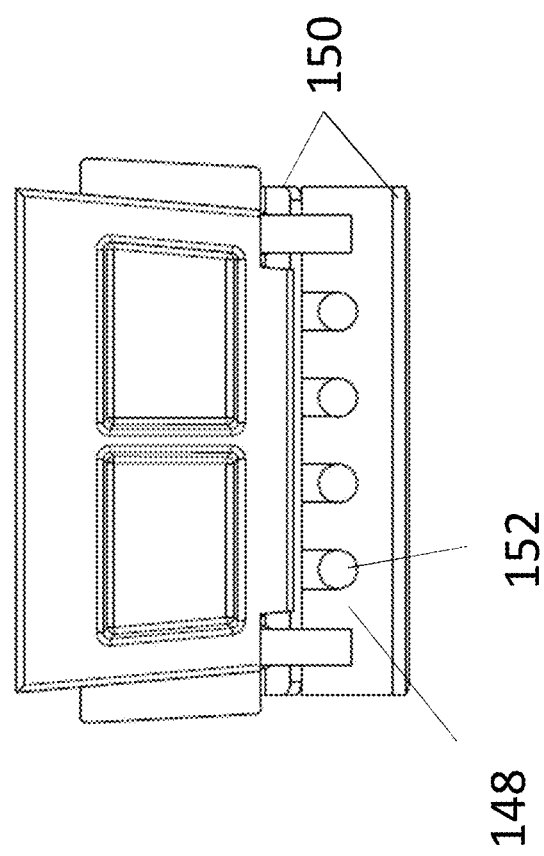
FIG. 20 is the view of FIG. 19, with elements shown in transparent to show stacking of channel plates and pressure plates according to aspects of the present disclosure.
Figure 21:
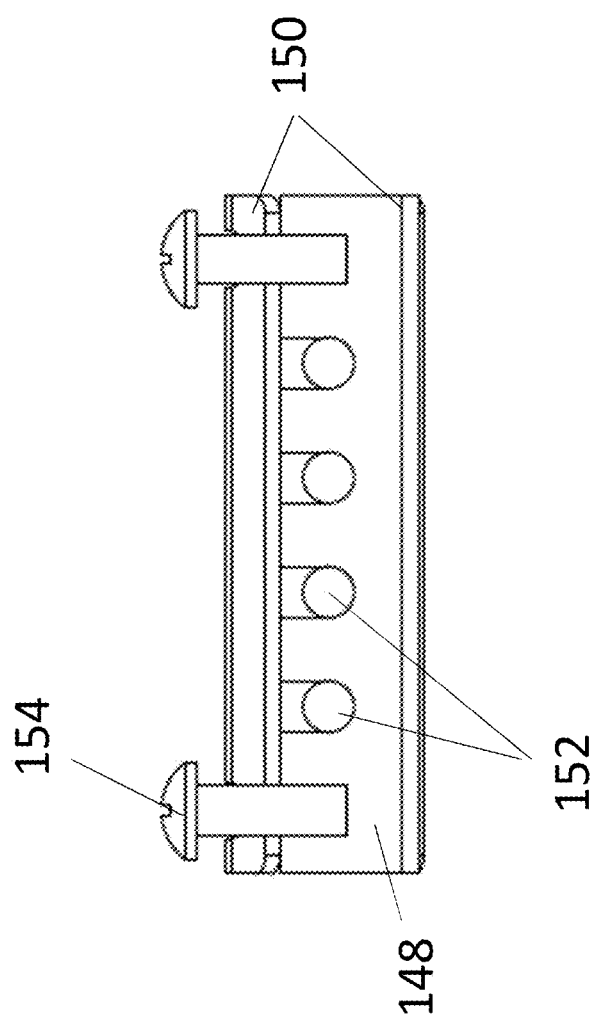
FIG. 21 is a bottom view of a channel plate and pressure plate combination according to aspects of the present disclosure.
Figure 22:
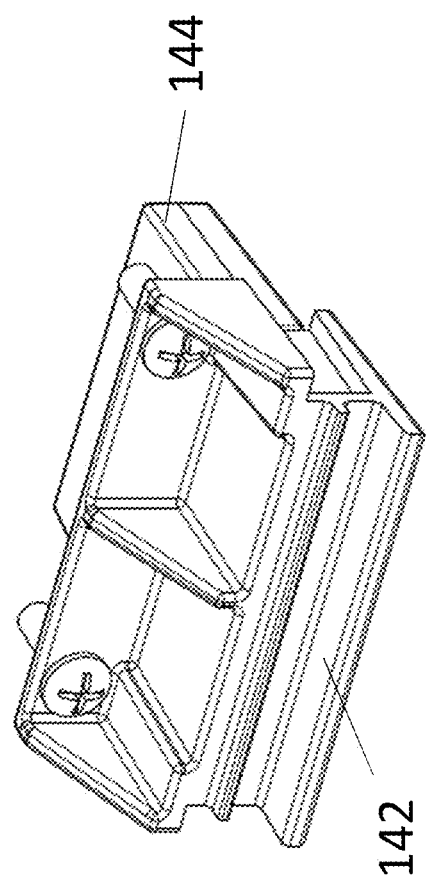
FIG. 22 is a perspective view of a removable plate and grommet combination according to aspects of the present disclosure.
Figure 23:
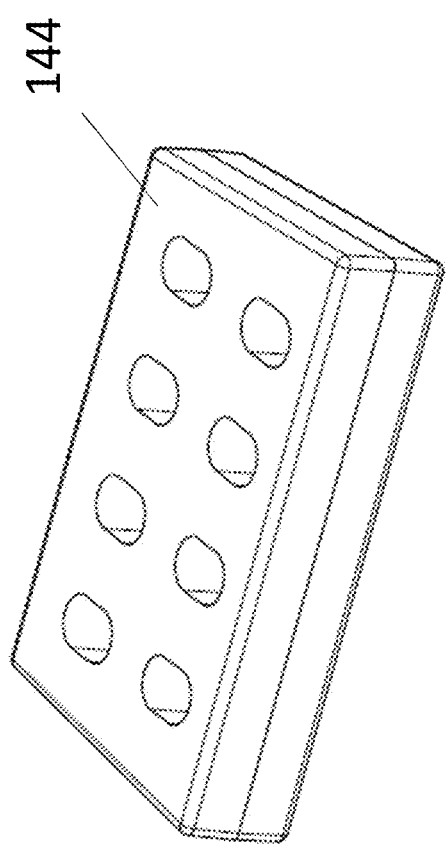
FIG. 23 is a perspective view of the grommet of FIG. 22 according to aspects of the present disclosure.

The housing opening portion 138 comprises a removable plate 142 and a grommet 144. The removable plate 142 may be configured as a removable portion of the housing 110 that is slidable into place relative to the housing 110 to complete the continuous shape of the housing outer wall (e.g., the plate completes a shape of the housing 110 and is flush therewith). The removable plate 142 may be configured such that a large slot is formed for receiving the cables 210. FIG. 14 provides a view of the housing 110 and shows the removable plate 142 in place closing the slot and further shows the grommet 144 providing apertures for receiving the drop cables 210. The grommet 144 may be, for example, a foam block and/or split grommet the provides a weatherproof seal around the drop cables 210 in the slot. The grommet 144 fills some of the space in the housing wall that is not covered by the removable plate 142. As also shown in FIG. 14, the removable plate 142 may include converging walls 146 to enhance the ease of removal and insertion. The removable plate 142 may further include apertures for receiving fasteners (e.g., screws or bolts) to secure the removable plate 142 to the housing 110.

The cable clamp portion 140 may include a channel plate 148 configured to be mounted to the housing 110 and a pressure plate 150 configured to press down on the flat drop cables 210. The channel plate 148 includes a plurality of channels 152 for the drop cables 210. The pressure plate 150 may be V-shaped to create two contact points for maintaining the drop cables 210 in place within the channels 152 and inhibiting axial sliding. In an exemplary embodiment, channel plates 148 and pressure plates 150 may be stacked to provide additional apertures. Fasteners 154 may extend through aligned apertures in the one or more channel plates 148 and one or more pressure plates 150, and the housing 110 to attach the cable clamp portion 140 to the housing 110.

As best seen in FIGS. 5, 7, and 14, the connector box 100 may also include a second housing opening portion 156 for the output cables 300 to exit the connector box 100. The second housing opening portion 156 may include fittings 158 with multiple media grommets for customizable cable fitting and knockout portions in the fittings 158 and/or housing 110 for additional space expansion as needed.

Disclosed embodiments of a connector box provide a compact, high-capacity housing for fiber optic cables to transition from a drop cable to end-user cables with selectable connections enclosed in the housing. The connector box provides weatherproof receptacles for enabling a drop cable to enter the connector box and includes a pressure plate for holding the drop cable in place. The configuration of the connector box provides enhanced cable management including routing mangers in the form of curved surfaces, posts, and clips to route the fiber optic cables effectively through the various compartments formed in the connector box. The connector box may be configured for various types of mounting situations, including wall, pole, post, aerial, etc.

Figure 24:
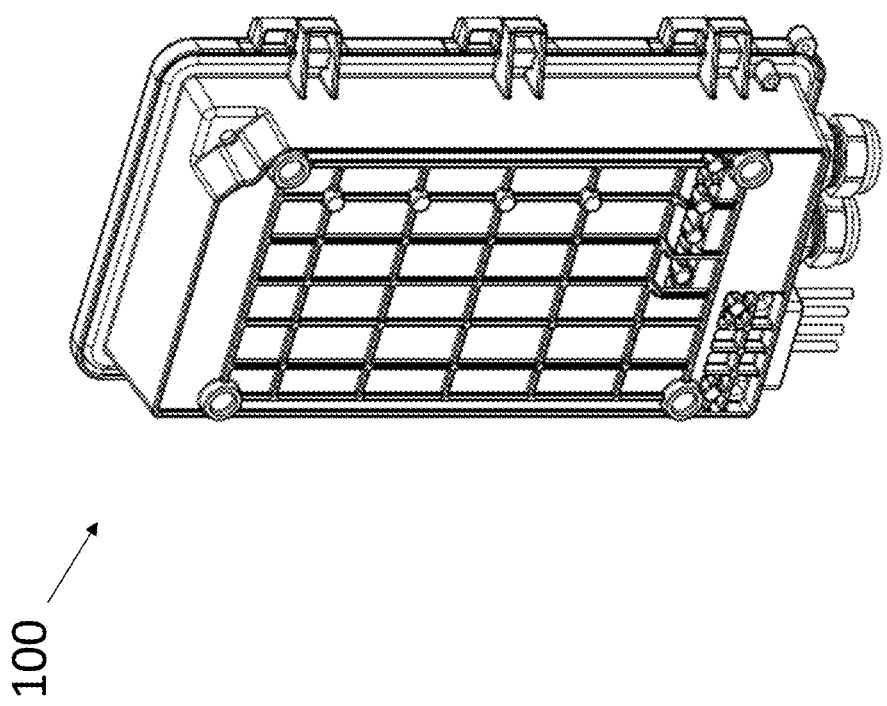
FIG. 24 is a rear perspective view of the connector box of FIG. 7 according to aspects of the present disclosure.
Figure 25:
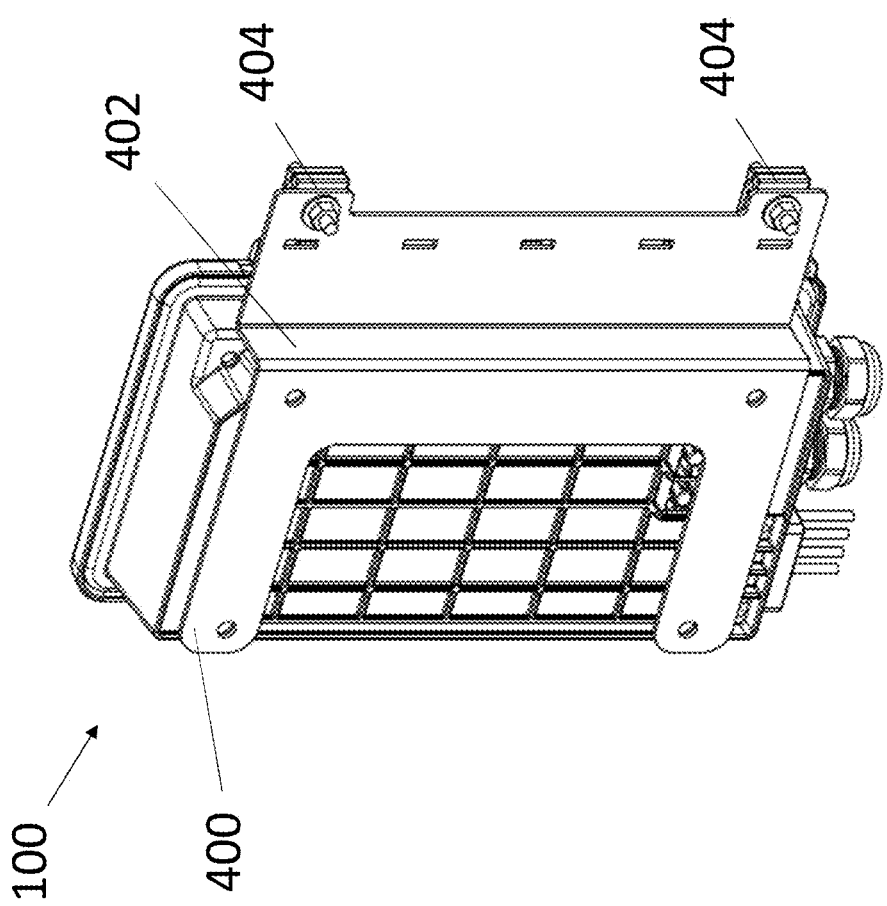
FIG. 25 is a rear perspective view of the connector box of FIG. 24, in combination with a mounting bracket, according to aspects of the present disclosure.
Figure 26:
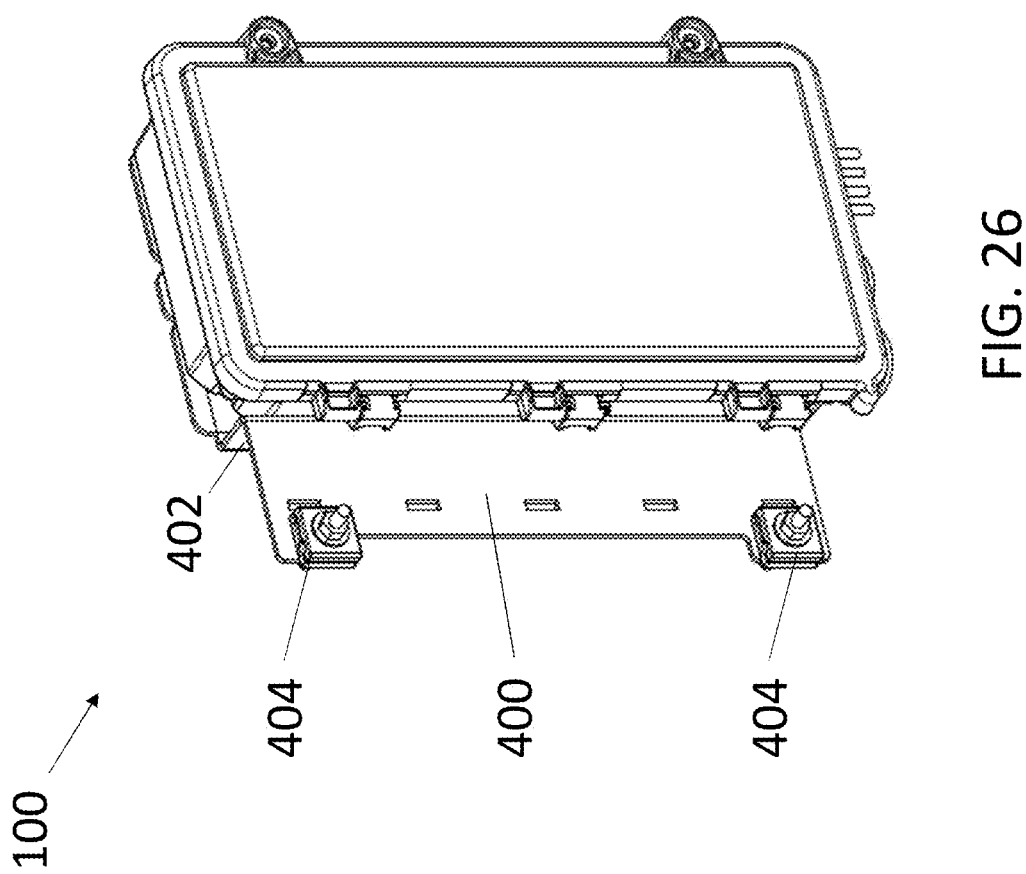
FIG. 26 is a front perspective view of the connector box and mounting plate combination according to aspects of the present disclosure.
Figure 27:
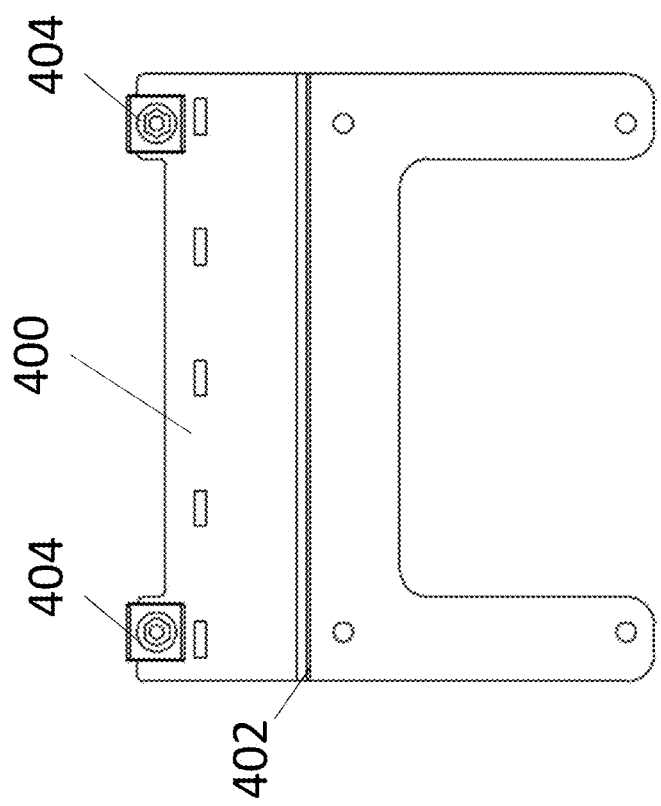
FIG. 27 is a front view of the mounting plate according to aspects of the present disclosure.
Figure 28:
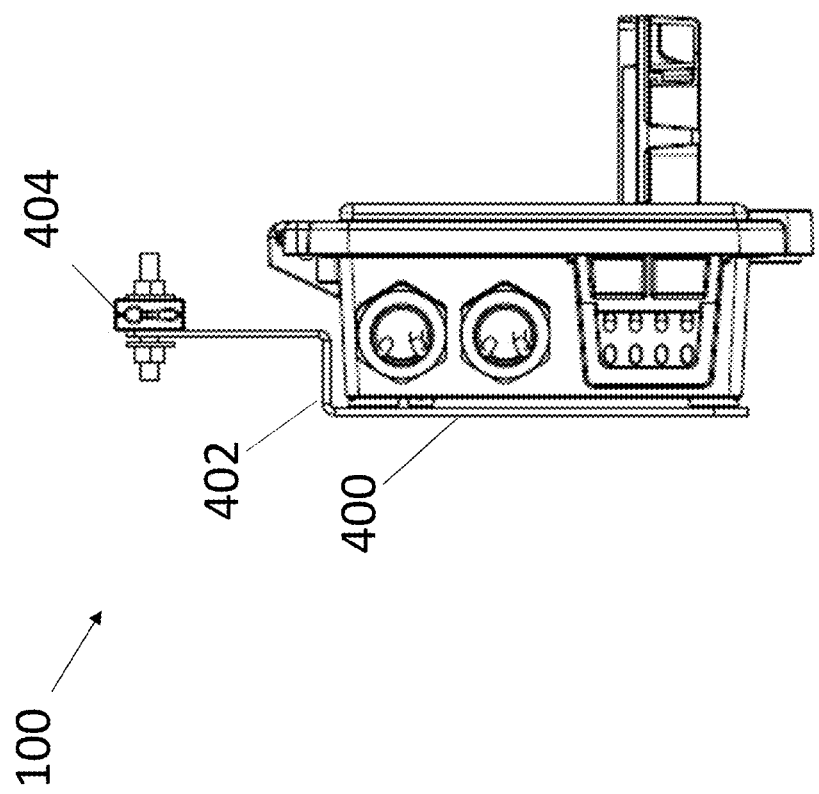
FIG. 28 is a bottom view of connector box and mounting plate combination according to aspects of the present disclosure.

FIGS. 24-28 further illustrate an exemplary mounting configuration using a strand mount bracket 400. FIG. 24 is a rear view of the connector box 100. A back panel of the connector box 100 housing 110 may include alignment features for the bracket 400. The bracket 400 may be connected to the housing 110 via apertures and fasteners. The bracket 400 may a stepped flange 402 that conforms to perpendicular surfaces of the housing 110. The mounting bracket 400 may further include strand connectors 404 configured to mount the connector box 100.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A connector box, comprising:
    a housing forming a space and a cover configured to provide access to the space;
    a plurality of connectors configured to enable selective connection of fiber optic cables within the enclosed space;
    a drop cable entrance assembly configured to provide an opening for one or more drop cables to enter the space in the housing, the drop cable entrance assembly comprising:
        a housing opening portion providing access to the space from an exterior of the housing and comprising a removable plate and a grommet, and
        a cable clamp portion configured to hold the one or more drop cables in place via contact pressure, wherein the cable clamp portion comprises a channel plate and a pressure plate attached to the housing.

2. The connector box of claim 1, wherein the housing opening portion is configured to fill in a slot formed in an outer wall of the housing.

3. The connector box of claim 2, wherein the removable plate is shaped to complete a continuous shape of the outer wall of the housing.

4. The connector box of claim 2, wherein the grommet is positioned between the removable plate and the housing.

5. The connector box of claim 1, wherein the removable plate is slidable relative to the housing.

6. The connector box of claim 1, wherein the grommet is a split grommet.

7. The connector box of claim 1, wherein the grommet is a foam block.

8. The connector box of claim 1, wherein the channel plate comprises a plurality of channels each for receiving a drop cable.

9. The connector box of claim 1, wherein the pressure plate is V-shaped to provide two contact points for holding the drop cable in place.

10. The connector box of claim 1, wherein the cable clamp portion comprises a plurality of channel plates and a plurality of pressure plates alternatively stacked on each other and attached to the housing.

11. The connector box of claim 1, further comprising an internal panel dividing the space into a front compartment and a rear compartment.

12. The connector box of claim 11, wherein the front compartment comprises a side compartment having a full depth of the housing.

13. The connector box of claim 12, wherein the drop cable entrance assembly is adjacent to the side compartment.

14. The connector box of claim 12, further comprising one or more routing managers configured to guide one or more cables within the front or rear compartment.

15. The connector box of claim 11, wherein the internal panel comprises a plurality of slots connecting the rear compartment to the front compartment, and wherein adapters are positioned in each of the plurality of slots, the adapters configured to provide selective connection between cables in the front compartment and cables in the rear compartment.

16. The connector box of claim 15, wherein the plurality of slots and adapters are angled to be closer to being parallel to a plane of the internal panel than to being perpendicular thereto.

17. The connector box of claim 15, wherein connector box provides at least forty-eight connections between cables in the front compartment and cables in the rear compartment via the adapters.

* * * * *